US008706429B2

(12) United States Patent
Nakajima

(10) Patent No.: US 8,706,429 B2
(45) Date of Patent: Apr. 22, 2014

(54) SENSOR APPARATUS AND ROBOT APPARATUS

(75) Inventor: Yohji Nakajima, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 13/226,725

(22) Filed: Sep. 7, 2011

(65) Prior Publication Data

US 2012/0065902 A1 Mar. 15, 2012

(30) Foreign Application Priority Data

Sep. 14, 2010 (JP) ................................. 2010-205722

(51) Int. Cl.
*G01B 21/32* (2006.01)
*B25J 13/08* (2006.01)
*G01L 3/00* (2006.01)
*G01L 5/00* (2006.01)

(52) U.S. Cl.
USPC ............................. 702/41; 702/56; 700/261

(58) Field of Classification Search
USPC ........ 702/41–44, 56; 700/245, 254, 258, 260, 700/261; 73/760, 763, 774, 818, 819
See application file for complete search history.

(56) References Cited

U.S. PATENT DOCUMENTS

| 5,990,645 | A | * | 11/1999 | Nakamura et al. | 318/432 |
| 7,501,783 | B2 | * | 3/2009 | Imadu et al. | 318/611 |
| 2007/0118252 | A1 | * | 5/2007 | Okazaki et al. | 700/254 |
| 2008/0140257 | A1 | * | 6/2008 | Sato et al. | 700/258 |
| 2010/0094312 | A1 | * | 4/2010 | Ruiz Morales et al. | 606/130 |

FOREIGN PATENT DOCUMENTS

JP 08-118275 A 5/1996

* cited by examiner

*Primary Examiner* — Manuel L Barbee
(74) *Attorney, Agent, or Firm* — Fitzpatrick, Cella, Harper & Scinto

(57) ABSTRACT

To well remove a noise component due to vibration of a flexible member from an original detection signal output from a detecting unit and suppress a phase delay of a detection signal obtained by filtering. For this purpose, the present invention provides a detecting unit including a flexible member deforming according to a state of an object to be measured and a sensor detecting an amount of deformation of the flexible member and outputting an original detection signal indicating a detection result. A filtering unit outputs a detection signal obtained by filtering the original detection signal using a filter coefficient. A calculating device calculates a vibration frequency of the flexible member contained in the original detection signal. A changing unit changes a filter coefficient of the filtering unit to cause the filtering unit to function as a filter for attenuating the vibration frequency calculated by the calculating device.

14 Claims, 13 Drawing Sheets

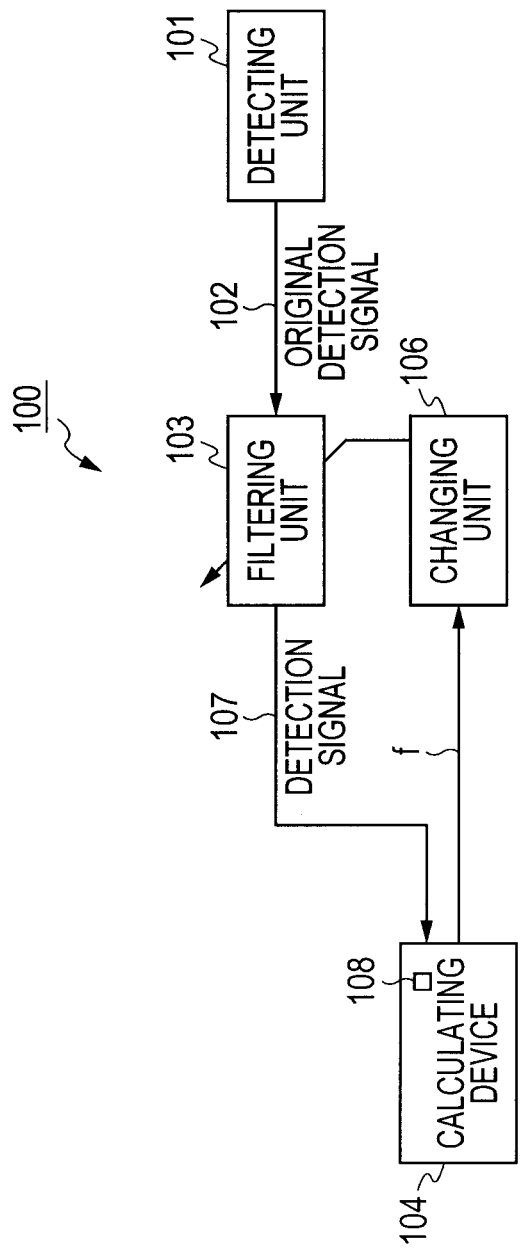

SENSOR APPARATUS AND ROBOT APPARATUS

BACKGROUND OF THE INVENTION

1. Field of the Invention

The present invention relates to a sensor apparatus having a detecting unit such as a force sensor and a torque sensor and a robot apparatus having the sensor apparatus, and more particularly to a robot apparatus for positioning in a stable manner and at a high speed.

2. Description of the Related Art

In general, the assembling robot apparatus includes a robot arm body having a plurality of links and a hand, in which the links are swingably coupled to each other through a joint portion. The joint portion includes a servomotor and positioning control is performed by driving the servomotor.

This type of robot apparatus has a torque sensor detecting a joint torque acting on a link. Based on the detected torque value, the robot apparatus generates a torque command value to control the servomotor (see Japanese Patent Application Laid-Open No. H08-118275). The torque sensor is configured to include a flexible member having a plurality of beams radially extending from a center portion and a ring-shaped frame connecting the beams; and a sensor detecting a deformation amount (deflection amount) of the flexible member. The torque sensor outputs a detection signal indicating a torque corresponding to the deformation amount of the flexible member.

Further, the robot apparatus includes a force sensor detecting a force applied to a hand when the hand grips an object to be gripped. The force sensor includes a flexible member which deforms according to the force applied to the hand by the object gripped by the hand; and a sensor detecting the deformation amount of the flexible member. The force sensor is configured to output a detection signal indicating a result of detection by the sensor.

Unfortunately, in the robot apparatus having the detecting unit such as the force sensor and the torque sensor, the robot arm body vibrates at a natural vibration frequency and thus the flexible member of the detecting unit also vibrates at the natural vibration frequency. Thus, the vibration of the flexible member causes the signal component of an output original detection signal to include a noise component vibrating at the natural vibration frequency. A control of each servomotor using the original detection signal including the noise component reduces the accuracy of positioning control on the hand and each link.

FIGS. 14A to 14D are graphs for describing the original detection signal from the detecting unit. As illustrated in FIG. 14A, it is found that a noise component N due to vibration of the robot arm body occurs in a frequency band higher than the frequency of a signal component S. In light of this, it can be considered to use a filter which removes a specific frequency component f1 from the original detection signal of the detecting unit to output the detection signal. If the frequency f1 of the noise component N vibrating at the natural vibration frequency does not change, the use of this filter can remove the noise component N from the original detection signal.

Unfortunately, the frequency of the noise component N due to the natural vibration frequency changes according to the weight of the object gripped by the hand. For example, as illustrated in FIG. 14B, the frequency may change to a frequency f2 different from the frequency f1. Consequently, if the frequency changes, this filter cannot remove the noise component N.

In light of this, it can be considered to apply a low pass filter having a frequency characteristic as illustrated in FIG. 14C of attenuating a frequency band W in a possible range of the noise component N in order to remove the noise component in the natural vibration frequency with changeable frequency from the original detection signal output from the detecting unit. Since the frequency component with a cutoff frequency fc or less has a low attenuation, the use of this filter allows the signal component S of the detection signal to pass and the noise component N to be cut off even if the frequency of the noise component N changes in the frequency band W higher than that of the signal component S.

In order to use this filter, the cutoff frequency fc needs to be set as low as possible so as to correspond to frequencies f1 and f2 in which the noise component N changes. Consequently, the signal component S of the detection signal exists in the vicinity of the cutoff frequency fc.

Unfortunately, as illustrated in FIG. 14D, the filter has a phase-frequency characteristic. Consequently, a phase shift occurs in a frequency band in the vicinity of the cutoff frequency fc of the filter. Thus, a phase delay always occurs in the signal component S of the detection signal subjected to filtering. As a result, a phase-delayed detection signal S is used to control the servomotor, leading to a delayed response to the target.

Thus, it is an object of the present invention to well remove a noise component due to vibration of a flexible member from an original detection signal output from a detecting unit and suppress a phase delay of a detection signal obtained by filtering.

SUMMARY OF THE INVENTION

A sensor apparatus of the present invention is a sensor apparatus including: a detecting unit including a flexible member deforming according to a state of an object to be measured and a sensor detecting an amount of deformation of the flexible member and outputting an original detection signal indicating a detection result; a digital filter outputting a detection signal obtained by filtering the original detection signal using a filter coefficient; a calculation unit calculating a vibration frequency of the flexible member contained in the original detection signal; and a change unit changing the filter coefficient of the digital filter to cause the digital filter to function as a filter for attenuating the vibration frequency calculated by the calculation unit.

Further, the sensor apparatus of the present invention includes: a detecting unit including a flexible member deforming according to a state of an object to be measured and a sensor detecting an amount of deformation of the flexible member and outputting an original detection signal indicating a detection result; a digital filter having a plurality of filtering units for filtering using a filter coefficient and outputting a detection signal obtained by filtering the original detection signal by the plurality of filtering units; a calculation unit calculating each of a plurality of vibration frequencies of the flexible member contained in the original detection signal; and a change unit changing the filter coefficient of each of the filtering units to cause the digital filter to function as a filter for attenuating each of the vibration frequencies calculated by the calculation unit.

Further, a robot apparatus of the present invention includes: a robot arm body having a plurality of links coupled through a joint portion, and a hand disposed in a distal link arranged in a distal portion of the plurality of links and gripping an object to be gripped; a plurality of actuators driving the plurality of links and the hand; a force sensor including a flexible member deforming according to a force or a torque acting on the hand, and a sensor detecting an amount of deformation of the flexible member and outputting an original detection signal indicating a detection result; a digital filter outputting a detection signal obtained by filtering the original detection signal using a filter coefficient; a calculation unit calculating a vibration frequency of the flexible member contained in the original detection signal; a change unit changing the filter coefficient of the digital filter to cause the digital filter to function as a filter for attenuating the vibration frequency calculated by the calculation unit; and a control unit controlling the actuator using the detection signal output from the digital filter.

Further, the robot apparatus of the present invention includes: a robot arm body having a plurality of links coupled through a joint portion, and a hand disposed in a distal link arranged in a distal portion of the plurality of links and gripping an object to be gripped; a plurality of actuators driving the plurality of links and the hand; a torque sensor including a flexible member deforming according to a torque acting on the link, and a sensor detecting an amount of deformation of the flexible member and outputting an original detection signal indicating a detection result; a digital filter outputting a detection signal obtained by filtering the original detection signal using a filter coefficient; a calculation unit calculating a vibration frequency of the flexible member contained in the original detection signal; a change unit changing the filter coefficient of the digital filter to cause the digital filter to function as a filter for attenuating the vibration frequency calculated by the calculation unit; and a control unit controlling the actuator using the detection signal output from the digital filter.

The present invention can well reduce noise contained in the original detection signal output by the detecting unit because a phase delay is suppressed even if the vibration frequency of the flexible member in the detecting unit changes.

Further features of the present invention will become apparent from the following description of exemplary embodiments with reference to the attached drawings.

BRIEF DESCRIPTION OF THE DRAWINGS

FIG. 1 is a block diagram illustrating a schematic configuration of a sensor apparatus according to a first embodiment of the present invention.

DESCRIPTION OF THE EMBODIMENTS

Figure 2A:
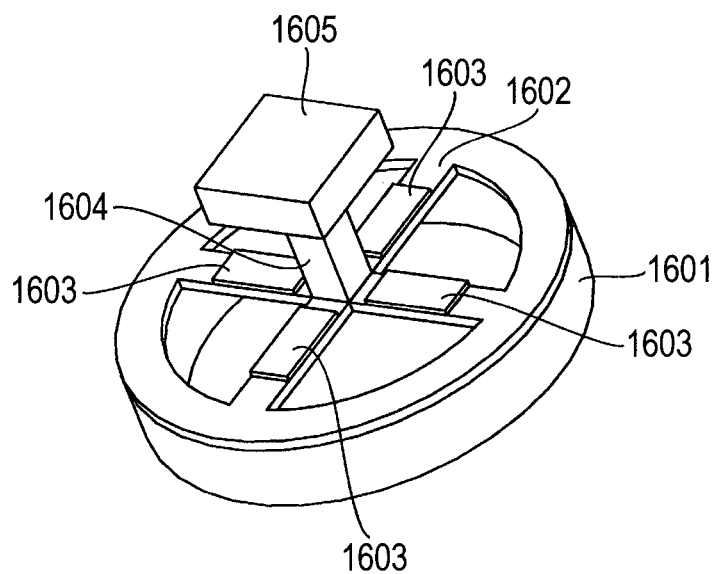
FIG. 2A illustrates a detecting unit, which is a force sensor.

Preferred embodiments of the present invention will now be described in detail in accordance with the accompanying drawings.

First Embodiment

FIG. 1 is a block diagram illustrating a schematic configuration of a sensor apparatus according to a first embodiment of the present invention. A sensor apparatus 100 includes a detecting unit 101, a filtering unit 103, which is a digital filter, a calculating device 104, which is a calculation unit, and a changing unit 106, which is a change unit.

The detecting unit 101 is a force sensor illustrated in FIG. 2A. The detecting unit 101, which is the force sensor illustrated in FIG. 2A has four flexible members 1602 and four strain sensors 1603 as a sensor. Each flexible member 1602 is fixed to a case 1601, and each strain sensor 1603 is fixed to each flexible member 1602. An object 1605 is fixed to each flexible member 1602 with a mounting structure 1604 sandwiched therebetween such that each flexible member 1602 deforms according to the state of the object 1605. Each strain sensor 1603 detects a strain amount (deflection amount) as the amount of deformation of the flexible member 1602 and outputs an original detection signal 102 (FIG. 1) indicating a detection result.

The calculation of four outputs from the four strain sensors 1603 enables the calculation of three components: up and down movement forces and falling torque of the object 1605. Note that an increase in the number of flexible members 1602 and strain sensors 1603 may increase the number of detection components. Here, the force sensors which are the detecting units 101 as illustrated in FIG. 2A output four original detection signals 102. Since noise removal operation is the same for each original detection signal 102, the following description will focus on one original detection signal 102.

The filtering unit 103 is a digital filter such as a FIR and an IIR. The filtering unit 103 uses a filter coefficient to filter the original detection signal 102 and outputs a detection signal 107. The filtering unit 103 can obtain the detection signal 107 reducing noise contained in the signal component contained in the original detection signal 102. However, an excessively high filtering effect may cause a phase delay in the detection signal 107 obtained after the original detection signal 102 is filtered. Further, the vibration frequency of the noise contained in the original detection signal 102 is not always constant.

In light of this, the calculating device 104 calculates the vibration frequency of the flexible member 1602 contained in the original detection signal 102. Here, the original detection signal 102 contains some noise of the natural vibration frequency f determined by a spring stiffness k of the flexible member 1602 and a total weight m of the mounting structure 1604 and the object 1605. The relational expression of k, m, and f is expressed by the following expression (1).

$$f = (1/2\pi)\sqrt{(k/m)} \qquad \text{Expression (1)}$$

Assuming that a gravitational acceleration is g and a force obtained from the detection signal 107 is F, the weight m is obtained by the following relational expression (2).

$$m = F/g \qquad \text{Expression (2)}$$

The calculating device 104 has a storage unit 108. The storage unit 108 preliminarily stores a relational expression indicating a correlation between the force F and the vibration frequency f. The detection signal 107 is input into the calculating device 104 and the calculating device 104 calculates the vibration frequency f of the noise using the relational expression stored in the storage unit 108. Specifically, the calculating device 104 obtains the force F acting on the object 1605 from the input detection signal 107, then obtains the weight m from the obtained force F, and then obtains the frequency f from the obtained weight m. Here, the values of the spring stiffness k and the gravitational acceleration g are preliminarily set in the calculating device 104. Note that a preliminary assignment of the expression (2) to the expression (1) facilitates the calculation.

A signal indicating the vibration frequency f calculated by the calculating device 104 is input into the changing unit 106 and the changing unit 106 changes the filter coefficient of the filtering unit 103, which is a digital filter to cause the filtering unit 103 to function as a filter for attenuating the vibration frequency f calculated by the calculating device 104. In particular, the changing unit 106 can cause the filtering unit 103 to function as a notch filter for attenuating the vibration frequency f.

Thus, based on the signal indicating the calculated vibration frequency f, the changing unit 106 changes the filter coefficient of the filtering unit 103, and thereby the filtering unit 103 is suitable for removing the vibration frequency f. Consequently, the phase delay of the detection signal 107 with respect to the original detection signal 102 can be suppressed more than the noise removal using a low pass filter with fixed filter characteristics. Thus, the filtering unit 103 can obtain the detection signal 107 removing noise from the original detection signal 102. Further, the use of an IIR with excellent phase characteristics as the filtering unit 103, which is a digital filter can effectively suppress the phase delay of the signal component.

Figure 2B:
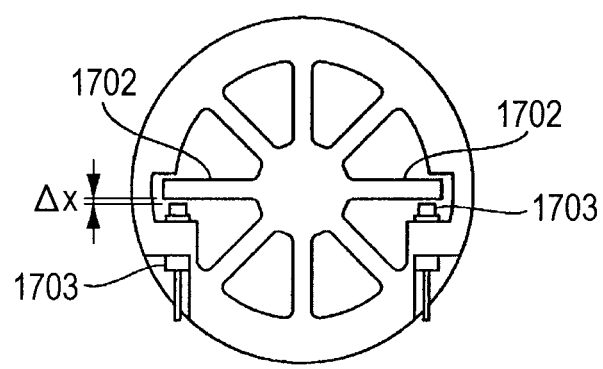
FIG. 2B illustrates a detecting unit, which is a torque sensor.

Note that this can be applied to a torque sensor used as the detecting unit 101 as illustrated in FIG. 2B. The torque sensor illustrated in FIG. 2B includes two flexible members 1702 and two sensors 1703 each of which detects a deformation amount Δx of each flexible member 1702 and outputs the original detection signal 102 indicating the detection result. An object to be measured is fixed to each flexible member 1702 such that each flexible member 1702 deforms according to the state of the object to be measured (unillustrated).

The natural vibration frequency f can be calculated by the following expression (3), which is a relational expression replacing the weight m in the expression (1) with an inertia I of a structure attached to the torque sensor and replacing the stiffness k with a torsional stiffness K of the torque sensor.

$$f = (1/2\pi)\sqrt{(K/I)} \qquad \text{Expression (3)}$$

The inertia I is obtained from a torque value of the torque sensor. The relational expression of the Expression (3) is preliminarily stored in the storage unit 108. The detection signal 107 is input into the calculating device 104 and the calculating device 104 uses the relational expression stored in the storage unit 108 to obtain the vibration frequency f of the noise. Thus, the vibration frequency f of the noise of the original detection signal 102 can be obtained by a simple calculation, thus reducing the calculation load of the calculating device 104. In other word, the costs of the calculating device 104 can be reduced.

Likewise, when the detecting unit 101 is a force sensor, the calculating device 104 can also calculate the vibration frequency f from the detection signal indicating a torque detected by the force sensor. Thus, regardless whether the detecting unit 101 detects a force or a torque, the above configuration can remove noise due to vibration of the flexible member.

Note that although not illustrated, instead of the relational expression, a table indicating the correlation between a force (or a torque) and a vibration frequency may be used to obtain the same results as in the relational expression. In this case, the table may be preliminarily stored in the storage unit 108. Then, the calculating device 104 may use the table to obtain the vibration frequency f.

Second Embodiment

Figure 3:
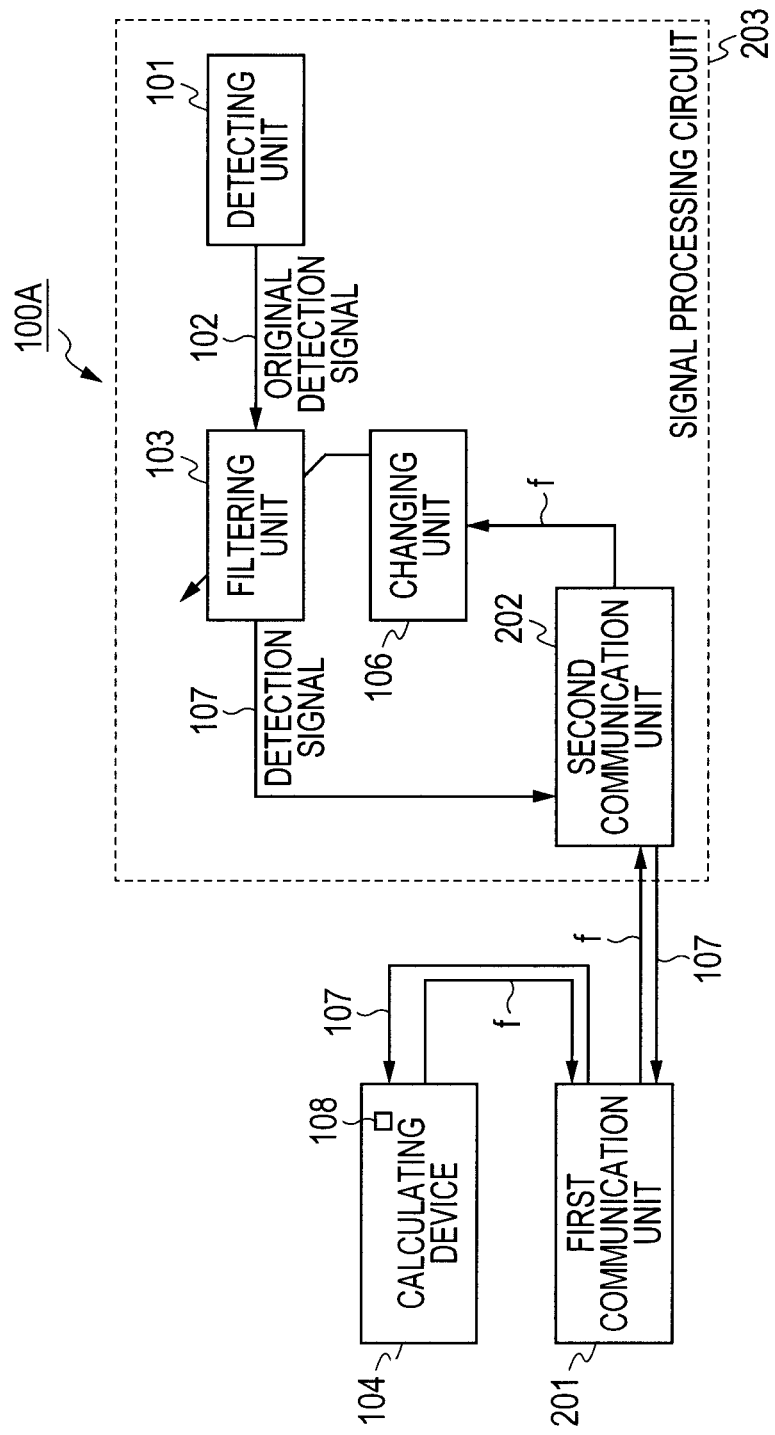
FIG. 3 is a block diagram illustrating a schematic configuration of a sensor apparatus according to a second embodiment of the present invention.

Now, the sensor apparatus according to a second embodiment of the present invention will be described in detail. FIG. 3 is a block diagram illustrating a schematic configuration of the sensor apparatus according to the second embodiment of the present invention. Note that in the second embodiment, the description of the same configuration as that of the first embodiment will be omitted. In the second embodiment, the calculating device 104 is arranged separately from the filtering unit 103 and the changing unit 106. The calculating device 104 performs the same calculation as that in the first embodiment and outputs a signal indicating the calculated vibration frequency f.

A sensor apparatus 100A of the second embodiment has a signal processing circuit 203. The signal processing circuit 203 includes the detecting unit 101, the filtering unit 103, and the changing unit 106. In other word, the calculating device 104 is arranged separately from the signal processing circuit 203.

In light of this, the sensor apparatus 100A of the second embodiment includes a first communication unit 201 connected to the calculating device 104; and a second communication unit 202 connected to the changing unit 106. Further, the communication units 201 and 202 are configured to communicate wiredly or wirelessly with each other.

More specifically, the first communication unit 201 functions as first sending means and first receiving means; and the second communication unit 202 functions as second sending means and second receiving means. The signal processing circuit 203 is configured to include the second communication unit 202; and the first communication unit 201 is arranged separately from the signal processing circuit 203.

A signal indicating the vibration frequency f calculated by the calculating device 104 is input into the first communication unit 201 functioning as the first sending means and the first communication unit 201 wiredly or wirelessly sends the signal indicating the vibration frequency f to the second communication unit 202 functioning as the second receiving means. When the signal indicating the vibration frequency f is received, the second communication unit 202 outputs the received signal indicating the vibration frequency f to the changing unit 106. Based on the signal indicating the vibration frequency f input from the second communication unit 202, the changing unit 106 changes the filter coefficient of the filtering unit 103. This configuration allows the filtering unit 103 to obtain the detection signal 107 well removing noise from the original detection signal 102.

Further, the second communication unit 202 functioning as the second sending means sends the detection signal 107 to the first communication unit 201 functioning as the first receiving means; and the first communication unit 201 sends the detection signal 107 to the calculating device 104. Then, the calculating device 104 uses the input detection signal 107 to calculate the vibration frequency f using a relational expression or a table stored in the storage unit 108.

Thus, communication between the first communication unit 201 and the second communication unit 202 enables distributed processing between a controller controlling the calculating device 104 and a controller controlling the changing unit 106 and the filtering unit 103. Thereby, the original detection signal 102 can be filtered at a high speed regardless of the calculation load of the calculating device 104.

Third Embodiment

Figure 4:
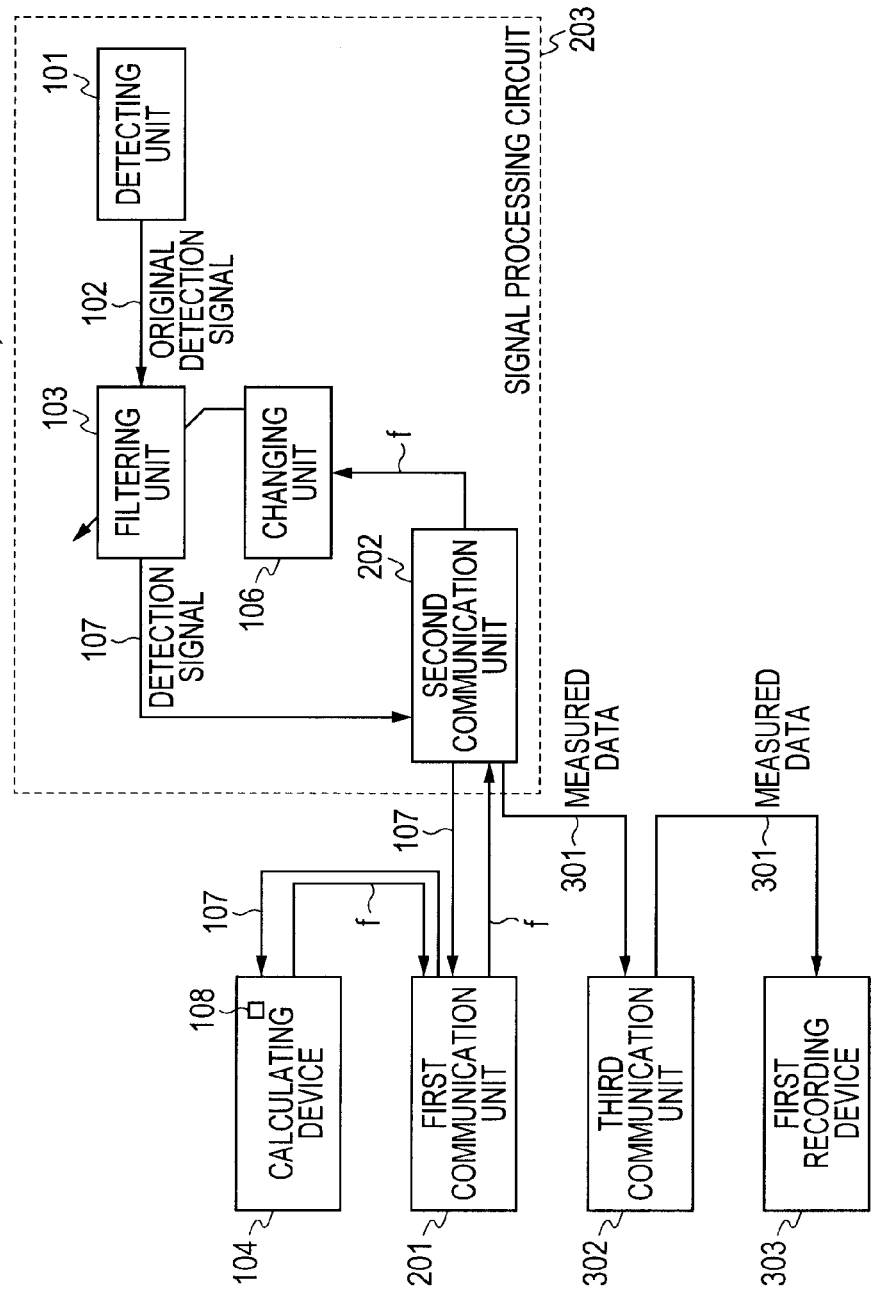
FIG. 4 is a block diagram illustrating a schematic configuration of a sensor apparatus according to a third embodiment of the present invention.

Now, the sensor apparatus according to a third embodiment of the present invention will be described in detail. FIG. 4 is a block diagram illustrating a schematic configuration of the sensor apparatus according to the third embodiment of the present invention. Note that in the third embodiment, the description of the same configuration as those of the first and second embodiments will be omitted.

A sensor apparatus 100B of the third embodiment further includes a third communication unit 302 and a first recording device 303. The original detection signal 102 from the detecting unit 101 is subjected to a process of removing noise by the filtering unit 103 to be the detection signal 107. At least one of the original detection signal 102 and the detection signal 107 is input into the second communication unit 202 functioning as the second sending means and the second communication unit 202 sends the signal indicating measured data 301 to the third communication unit 302.

The signal indicating the measured data 301 sent to the third communication unit 302 is output to the first recording device 303 and the measured data 301 is recorded in the first recording device 303. In other word, the third communication unit 302 functions as third receiving means of receiving the signal indicating measured data.

Thus, the third embodiment can exert the same effects as the first and second embodiments. Further, the second communication unit 202 is connected to the third communication unit 302 as a means of inputting the measured data 301 to the first recording device 303, but the connection may be shared with a connection between the first communication unit 201 and the second communication unit 202. This configuration can eliminate separate connections.

Fourth Embodiment

Figure 5:
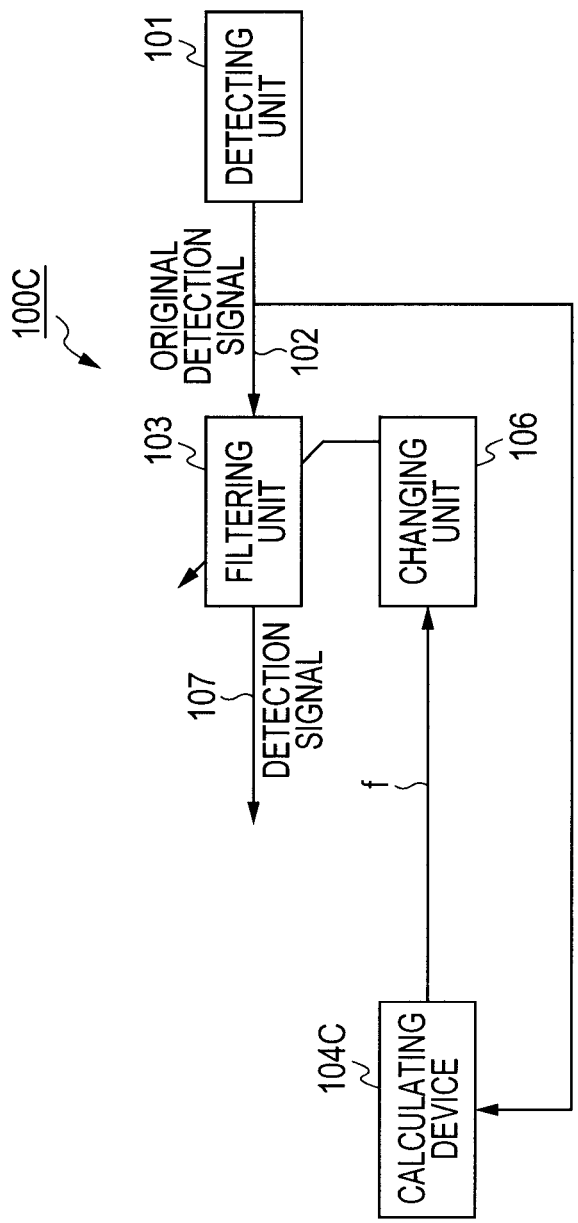
FIG. 5 is a block diagram illustrating a schematic configuration of a sensor apparatus according to a fourth embodiment of the present invention.

Now, the sensor apparatus according to a fourth embodiment of the present invention will be described in detail. FIG. 5 is a block diagram illustrating a schematic configuration of the sensor apparatus according to the fourth embodiment of the present invention. Note that in the fourth embodiment, the description of the same configuration as that of the first to third embodiments will be omitted.

A sensor apparatus 100C illustrated in FIG. 5 includes the detecting unit 101, the filtering unit 103 as a digital filter, a calculating device 104C as a calculation unit, and the changing unit 106 as a change unit, but the calculation of the calculating device 104C is different from that in the first to third embodiments.

The original detection signal 102 is input into the calculating device 104C and the calculating device 104C performs a fast Fourier transformation to convert the original detection signal 102 from a time domain signal to a frequency domain signal. Then, the calculating device 104C extracts a frequency component that is a frequency exceeding the frequency band of a signal component contained in the original detection signal 102 and is a peak value from the calculation result as the vibration frequency f and outputs a signal indicating the vibration frequency f.

In other word, the calculating device 104C performs an FFT analysis on the input original detection signal 102. The FFT analysis is to perform a fast Fourier transformation on the input original detection signal 102 to detect a peak value in a frequency exceeding the frequency band preliminarily assumed as the vibration frequency f of noise, namely, the frequency band of the signal component. Then, the vibration frequency indicating the peak value is determined as the vibration frequency f of noise. Then, for example, about twice the average signal level is set as a threshold and a value exceeding the threshold is determined as the peak value.

Like the first embodiment, A signal indicating the vibration frequency f of noise from the calculating device 104C is input into the changing unit 106, and based on the signal indicating the vibration frequency f, the changing unit 106 changes the filter coefficient of the filtering unit 103. Like the first embodiment, this configuration can suppress the phase delay of the detection signal 107 with respect to the original detection signal 102 and allows the filtering unit 103 to obtain the detection signal 107 well removing noise from the original detection signal 102.

Fifth Embodiment

Figure 6:
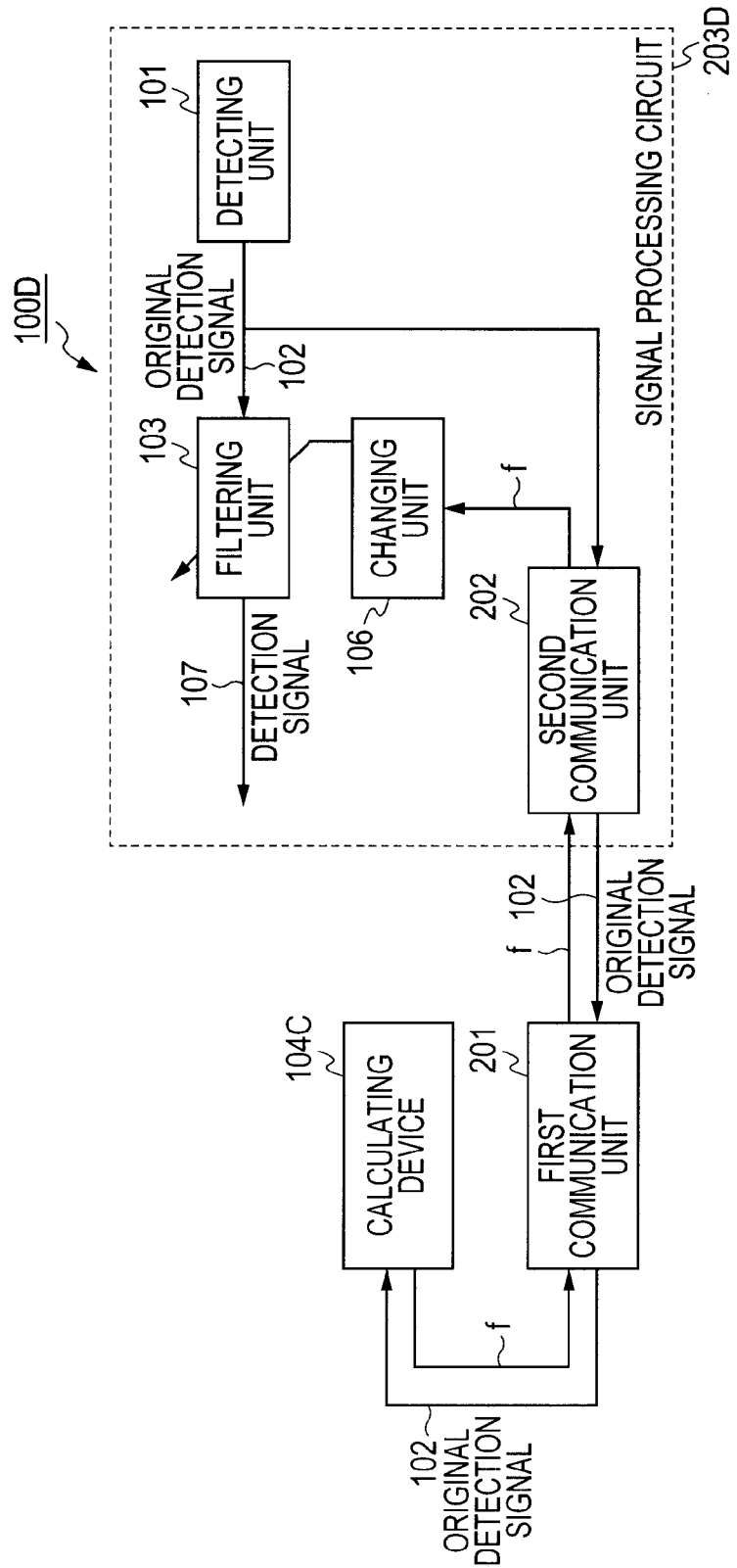
FIG. 6 is a block diagram illustrating a schematic configuration of a sensor apparatus according to a fifth embodiment of the present invention.

Now, the sensor apparatus according to a fifth embodiment of the present invention will be described in detail. FIG. 6 is a block diagram illustrating a schematic configuration of the sensor apparatus according to the fifth embodiment of the present invention. Note that in the fifth embodiment, the description of the same configuration as that of the first to fourth embodiments will be omitted.

In the fifth embodiment, the calculating device 104C is arranged separately from the filtering unit 103 and the changing unit 106. The calculating device 104C performs the same calculation as that in the fourth embodiment and outputs a signal indicating the vibration frequency f.

A sensor apparatus 100D of the fifth embodiment has a signal processing circuit 203D. The signal processing circuit 203 includes the detecting unit 101, the filtering unit 103, and the changing unit 106. In other word, the calculating device 104C is arranged separately from the signal processing circuit 203.

In light of this, the sensor apparatus 100D of the fifth embodiment includes the first communication unit 201 connected to the calculating device 104C; and the second communication unit 202 connected to the changing unit 106.

Further, the communication units 201 and 202 are configured to communicate wiredly or wirelessly with each other. Thus, the signal processing circuit 203D is configured to include the second communication unit 202, and the first communication unit 201 is arranged separately from the signal processing circuit 203.

The second communication unit 202 sends the original detection signal 102 to the first communication unit 201 and the first communication unit 201 outputs the original detection signal 102 to the calculating device 104C. The original detection signal 102 is input into the calculating device 104C and the calculating device 104C performs a fast Fourier transformation to convert the original detection signal 102 from a time domain signal to a frequency domain signal. Then, the calculating device 104C extracts a frequency component that is a frequency exceeding the frequency band of a signal component contained in the original detection signal 102 and is a peak value from the calculation result as the vibration frequency f and outputs a signal indicating the vibration frequency f.

The signal indicating the vibration frequency f calculated by the calculating device 104C is input into the first communication unit 201 and the first communication unit 201 wiredly or wirelessly sends the signal indicating the vibration frequency f to the second communication unit 202. When the signal indicating the vibration frequency f is received, the second communication unit 202 outputs the received signal indicating the vibration frequency f to the changing unit 106. Based on the signal indicating the vibration frequency f input from the second communication unit 202, the changing unit 106 changes the filter coefficient of the filtering unit 103. This configuration allows the filtering unit 103 to obtain the detection signal 107 well removing noise from the original detection signal 102.

Thus, communication between the first communication unit 201 and the second communication unit 202 enables distributed processing between a controller controlling the calculating device 104C and a controller controlling the changing unit 106 and the filtering unit 103. Thereby, the original detection signal 102 can be filtered at a high speed regardless of the calculation load of the calculating device 104C.

Sixth Embodiment

Figure 7:
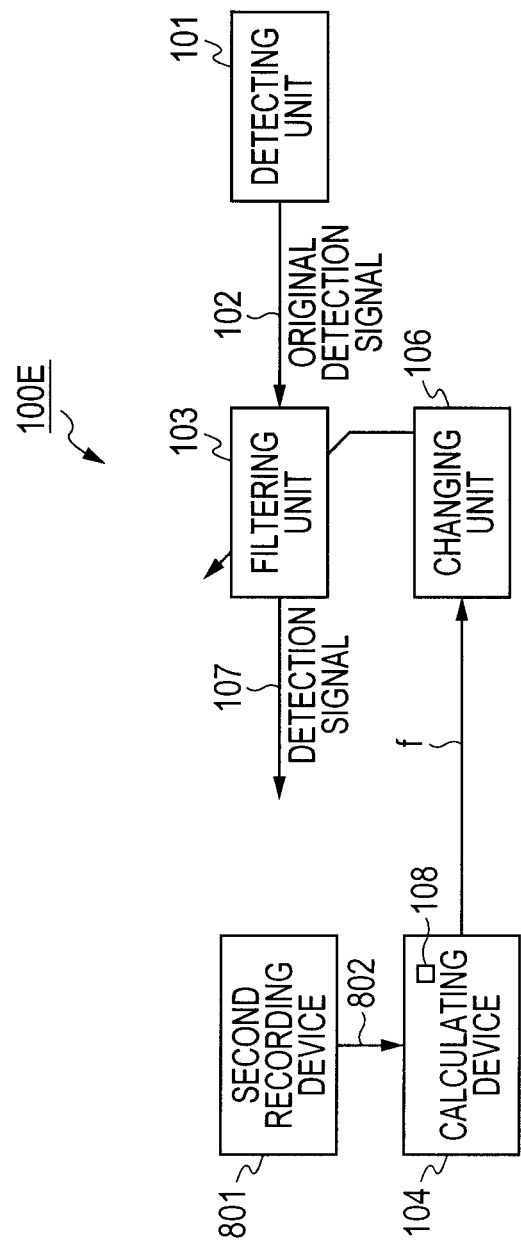
FIG. 7 is a block diagram illustrating a schematic configuration of a sensor apparatus according to a sixth embodiment of the present invention.

Now, the sensor apparatus according to a sixth embodiment of the present invention will be described in detail. FIG. 7 is a block diagram illustrating a schematic configuration of the sensor apparatus according to the sixth embodiment of the present invention. Note that in the sixth embodiment, the description of the same configuration as that of the first to fifth embodiments will be omitted. Like the first embodiment, a sensor apparatus 100E of the sixth embodiment includes the detecting unit 101, the filtering unit 103, the calculating device 104, and the changing unit 106. The sensor apparatus 100E further includes a second recording device 801.

Instead of inputting the detection signal 107, A signal 802 is input from the second recording device 801 into the calculating device 104. The original detection signal 102 output from the detecting unit 101 is subjected to a process of removing noise by the filtering unit 103.

The second recording device 801 records information including the detection signal 107, the weight of the structure, and the stiffness of the detecting unit 101. The signal 802 indicating information recorded in the second recording device 801 is output to the calculating device 104. The calculating device 104 performs two types of calculations. One is the same as the expression (1) using the signal 802.

The other is the same as the expression (3). In this case, the signal 802 includes an inertia instead of the weight of the structure and a torsional stiffness instead of the stiffness of the detecting unit 101. Further, when the stiffness of the structure is remarkably low with respect to the stiffness of the detecting unit, namely, the structure is flexible, the signal 802 includes the weight of a distal portion ahead of a flexible portion of the structure instead of the weight of the structure and the stiffness of the structure instead of the stiffness of the detecting unit 101. Thus, the vibration ahead of the flexible portion becomes noise, the vibration frequency of the noise can be calculated.

The vibration frequency 105 of the original detection signal 102 is calculated by any one of the calculations. The vibration frequency 105 calculated by the calculating device 104 is output to the changing unit 106. The changing unit 106 changes the filtering unit 103 based on the vibration frequency 105. This configuration allows the vibration frequency 105 to be obtained by a simple calculation and in a more precise manner, and allows the filtering unit 103 to obtain the detection signal 107 well removing noise from the original detection signal 102.

Seventh Embodiment

Figure 8:
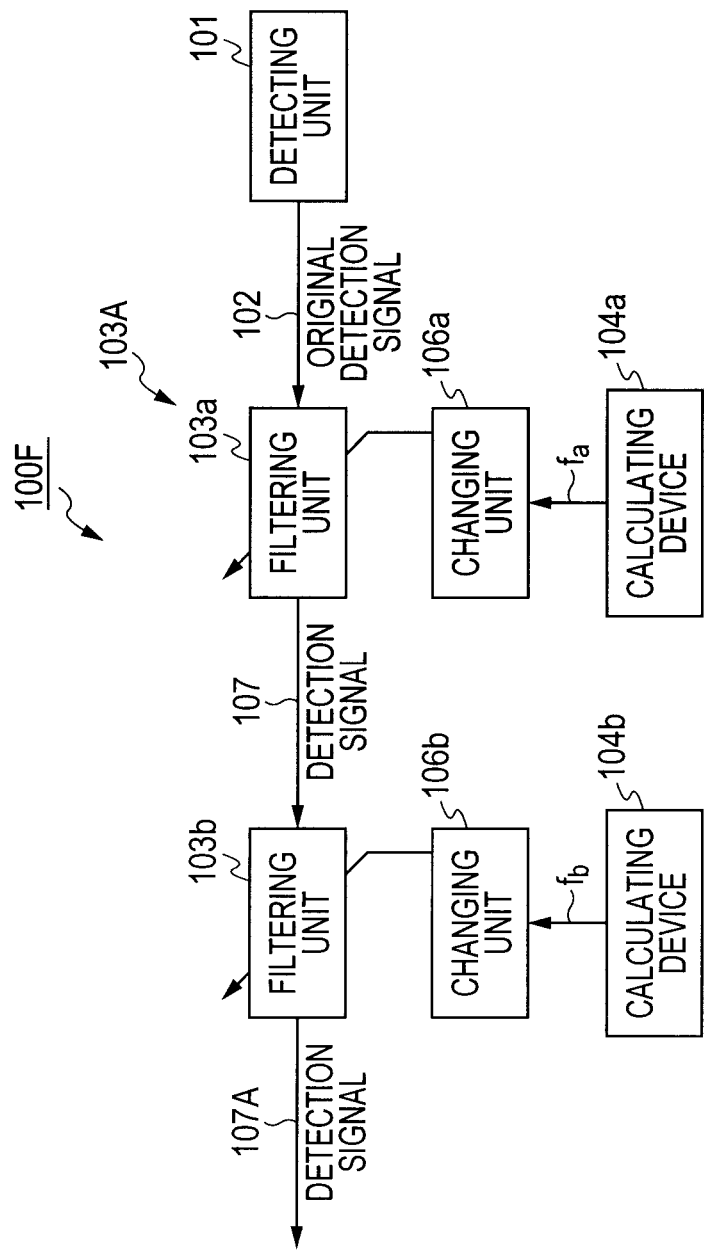
FIG. 8 is a block diagram illustrating a schematic configuration of a sensor apparatus according to a seventh embodiment of the present invention.

Now, the sensor apparatus according to a seventh embodiment of the present invention will be described. FIG. 8 is a block diagram illustrating a schematic configuration of the sensor apparatus according to the seventh embodiment of the present invention. Note that in the seventh embodiment, the description of the same configuration as that of the first to sixth embodiments will be omitted.

A sensor apparatus 100F according to the seventh embodiment includes the detecting unit 101 like the first embodiment, and a digital filter 103A having a plurality of filtering units 103a and 103b. Further, the sensor apparatus 100F includes a plurality of changing units 106a and 106b as the change unit, and a plurality of calculating devices 104a and 104b as the calculation unit. Assuming that the noise contained in the original detection signal 102 has two peaks, the seventh embodiment provides two filtering units, two calculating devices, and two changing units. The description thereof is as follows.

The original detection signal 102 output from the detecting unit 101 is subjected to a process of removing noise by the filtering unit 103a, and the processed signal, namely, the detection signal 107 is subjected to a process of removing noise of another frequency by the filtering unit 103b.

Vibration frequencies $f_a$ and $f_b$ of the noise calculated by the respective calculating devices 104a and 104b are output to the respective changing units 106a and 106b. Each of the changing units 106a and 106b changes the filter coefficients of the respective filtering units 103a and 103b based on the respective vibration frequencies $f_a$ and $f_b$.

More specifically, the first vibration frequency $f_a$ calculated by the first calculating device 104a is output to the first changing unit 106a. The first changing unit 106a changes the filter coefficient of the first filtering unit 103a based on the first vibration frequency $f_a$. Likewise, the second vibration frequency $f_b$ calculated by the second calculating device 104b is output to the second changing unit 106b. The second changing unit 106b changes the filter coefficient of the second filtering unit 103b based on the second vibration frequency $f_b$.

Thus, the seventh embodiment includes a digital filter 103A having a plurality of filtering units 103a and 103b to remove vibration frequencies of a plurality of noises and thereby obtain the detection signal 107A better removing noise from the original detection signal 102.

Note that the seventh embodiment has described that the calculation unit is made of a plurality of calculating devices, but the calculation unit may be one calculating device. In this case, the one calculating device may detect a plurality of vibration frequencies. Note also that the seventh embodiment has described that the change unit is made of a plurality of changing units, but the change unit may be one changing unit. In this case, one changing unit can change the filter coefficients of a plurality of filtering units to obtain the similar effect.

Note also that the seventh embodiment has described that the digital filter has two filtering units, but the number of filtering units may increase according to the number of noise peaks for a good noise processing. Note that as a result of calculation, if the number of noise peaks is smaller than the number of filtering units, the excess filtering units may pass through the entire frequency band.

Eighth Embodiment

Figure 9:
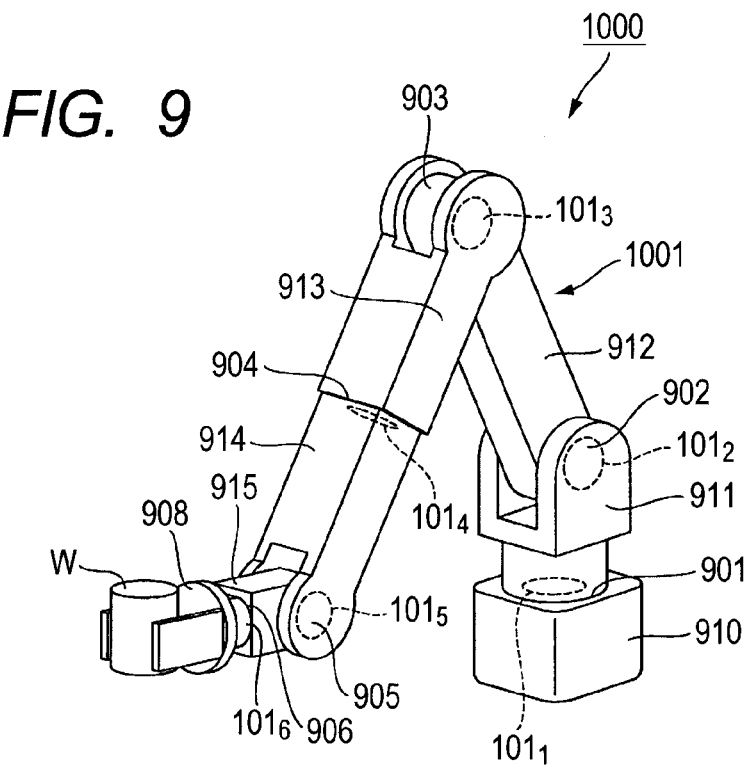
FIG. 9 is a perspective view illustrating a schematic configuration of a robot apparatus according to an eighth embodiment of the present invention.
Figure 10:
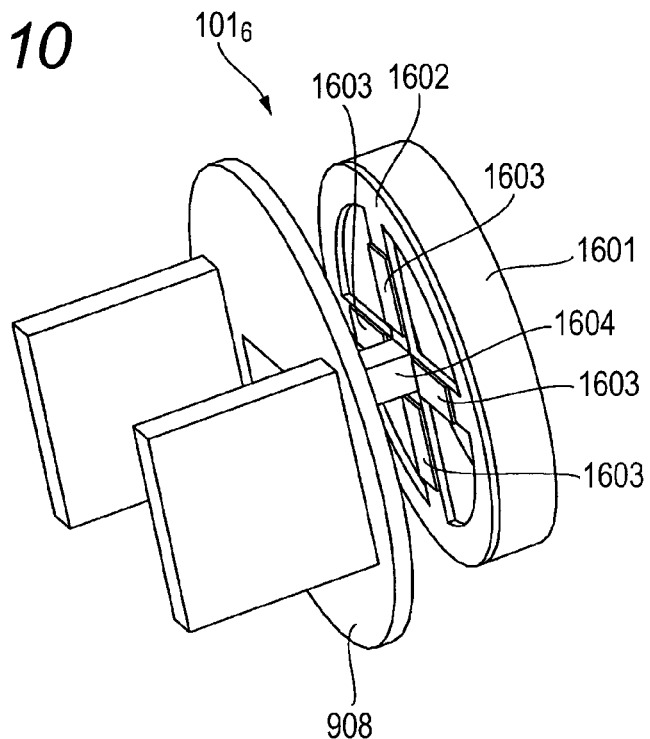
FIG. 10 is an enlarged perspective view of a robot apparatus in the vicinity of a hand.
Figure 11:
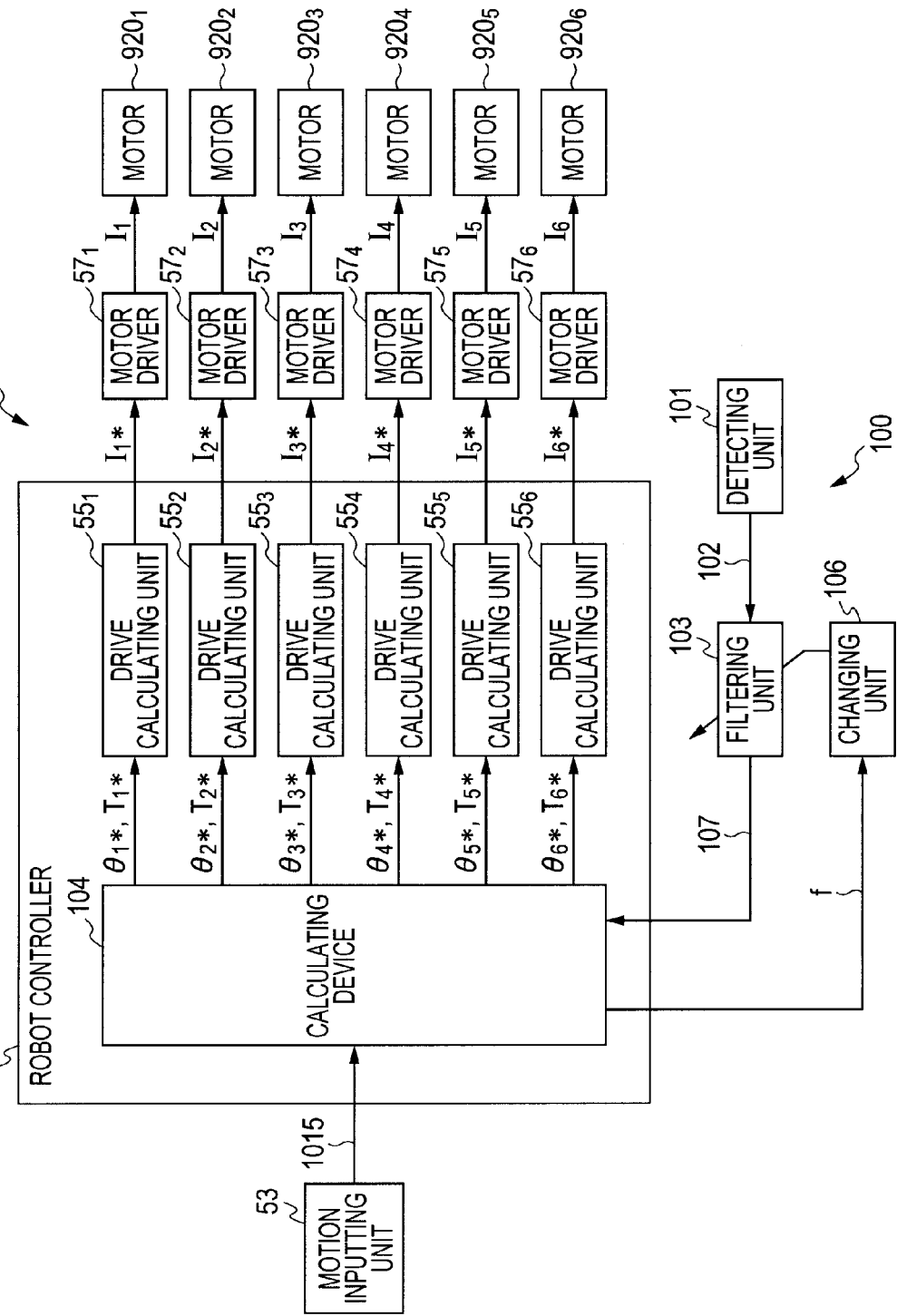
FIG. 11 is a block diagram illustrating a schematic configuration of a robot apparatus according to the eighth embodiment of the present invention.

Now, a robot apparatus according to an eighth embodiment of the present invention will be described. FIG. 9 is a perspective view illustrating a schematic configuration of the robot apparatus according to the eighth embodiment of the present invention. FIG. 10 is an enlarged perspective view in the vicinity of a hand of the robot apparatus. FIG. 11 is a block diagram illustrating a schematic configuration of the robot apparatus according to the eighth embodiment of the present invention.

A robot apparatus 1000 of the eighth embodiment has a sensor apparatus corresponding to the sensor apparatus of the first embodiment. Hereinafter, the configuration of the robot apparatus 1000 of the eighth embodiment will be described in detail. The robot apparatus 1000 includes a robot arm body (manipulator) 1001 illustrated in FIG. 9; and a drive apparatus and a control apparatus 50 illustrated in FIG. 11.

The manipulator 1001 includes a base 910 coupled through a plurality of joint portions 901, 902, 903, 904, 905, and 906; a plurality of links 911, 912, 913, 914, and 915; and a hand 908.

More specifically, the base 910 is coupled with the first link 911 through the first joint portion 901. The first link 911 is coupled with the second link 912 through the second joint portion 902. The second link 912 is coupled with the third link 913 through the third joint portion 903. The third link 913 is coupled with the fourth link 914 through the fourth joint portion 904. The fourth link 914 is coupled with the fifth link 915 through the fifth joint portion 905.

The fifth link 915 is a distal link disposed at a distal portion of the manipulator 1001. The hand 908 for gripping a work W, which is an object to be gripped is disposed at the fifth link 915, which is the distal link. The fifth link 915 is coupled with the hand 908 through the sixth joint portion 906.

Detecting units $101_1$, $101_2$, $101_3$, $101_4$, and $101_5$ which are torque sensors are provided in the respective joint portions 901, 902, 903, 904, and 905. The detecting unit $101_6$, which is a force sensor is provided in the sixth joint portion 906. Further, the joint portions 901 to 906 have the respective motors $920_1$ to $920_6$ (FIG. 11) of the first to sixth joints as a plurality of actuators which are drive apparatuses for driving the respective links 911 to 915 and the hand 908. In a state in which the hand 908 is gripping the work W, the work W can be moved by driving the motors $920_1$ to $920_6$.

The detecting unit $101_6$, which is a force sensor has the same configuration as that in FIG. 2A described in the first embodiment. More specifically, as illustrated in FIG. 10, the detecting unit $101_6$, which is a force sensor includes the case 1601 disposed in the sixth joint portion 906; the flexible member 1602 connected to the case 1601; and the strain sensors 1603 as four sensors fixed to the flexible member 1602. The hand 908 is connected to the flexible member 1602 through the mounting structure 1604. Note that the detecting units $101_1$ to $101_5$ which are torque sensors also have the same configuration as that in FIG. 2B described in the first embodiment, and include a flexible member 1702 and a sensor 1703.

The detecting unit $101_6$, which is a force sensor can obtain the force and the torque acting on the hand 908 using the four detection signals obtained by filtering the four original detection signals output from the four strain sensors 1603. Likewise, the detecting units $101_1$ to $101_5$ which are torque sensors can obtain the torque acting on the respective links using the two detection signals obtained by filtering the two original detection signals output from the two sensors 1703.

Here, a plurality of original detection signals is output from the respective detecting units $101_1$ to $101_6$, but the same filtering is performed on each of the original detection signals, and thus the eighth embodiment will describe each of the detecting units $101_1$ to $101_6$ as the detecting unit 101. Further, the description will focus on one original detection signal of the plurality of original detection signals output from the detecting unit 101. Thus, in the following description, the detecting unit 101 outputs an original detection signal indicating a force or a torque.

As illustrated in FIG. 11, the control apparatus 50 of the robot apparatus 1000 includes a robot controller 51, a motion inputting unit 53, and the sensor apparatus 100 like the first embodiment. The sensor apparatus 100 includes the detecting unit 101, the filtering unit 103 as a digital filter, the calculating device 104 as a calculation unit, and the changing unit 106 as a change unit as described above.

The detecting unit 101 outputs the original detection signal 102 indicating a force or a torque acting on the hand 908 (or an original detection signal indicating a torque acting on a link). The filtering unit 103 is a digital filter such as an FIR and an IIR. The filtering unit 103 uses a filter coefficient to filter the original detection signal 102 and outputs the detection signal 107.

The robot controller 51 includes the calculating device 104 and drive calculating units $55_1$ to $55_6$ for performing so-called impedance control. The robot controller 51 functions as a control unit for controlling motors $920_1$ to $920_6$ using the detection signal 107 output from the filtering unit 103. In other word, the calculating device 104 functions not only as a calculation unit but also as a control unit. Here, the eighth embodiment controls moving the manipulator 1001 as the impedance control so as to maintain a constant output from the detecting unit $101_6$, which is a force sensor.

Note that in the eighth embodiment, the calculating device 104 is included in the robot controller 51, but may be arranged separately from the robot controller. More specifically, the calculating device may function as the calculation unit and the robot controller arranged separately from the calculating device may function as the control unit.

The motion inputting unit 53 outputs a motion command 1015 to the manipulator 1001. The motion command 1015 is input into the calculating device 104 of the robot controller 51 and the calculating device 104 generates position target values $\theta_1^*$ to $\theta_6^*$ and torque target values $T_1^*$ to $T_6^*$ of the respective motors $920_1$ to $920_6$ based on the motion command 1015 and the detection signal 107.

Based on the respective position target values $\theta_1^*$ to $\theta_6^*$ and the respective torque target values $T_1^*$ to $T_6^*$, the respective drive calculating units $55_1$ to $55_6$ obtains the respective electrical current target values $I_1^*$ to $I_6^*$ of the respective motors $920_1$ to $920_6$ and outputs them to the respective motor drivers $57_1$ to $57_6$. The respective motor drivers $57_1$ to $57_6$ supply the respective motors $920_1$ to $920_6$ with respective currents $I_1$ to $I_6$ according to the respective input electrical current target values $I_1^*$ to $I_6^*$. Then, the respective motors $920_1$ to $920_6$ operate according to the respective position target values $\theta_1^*$ to $\theta_6^*$ and the respective torque target values $T_1^*$ to $T_6^*$ and drive the respective links 911 to 915 and the hand 908.

Figure 12:
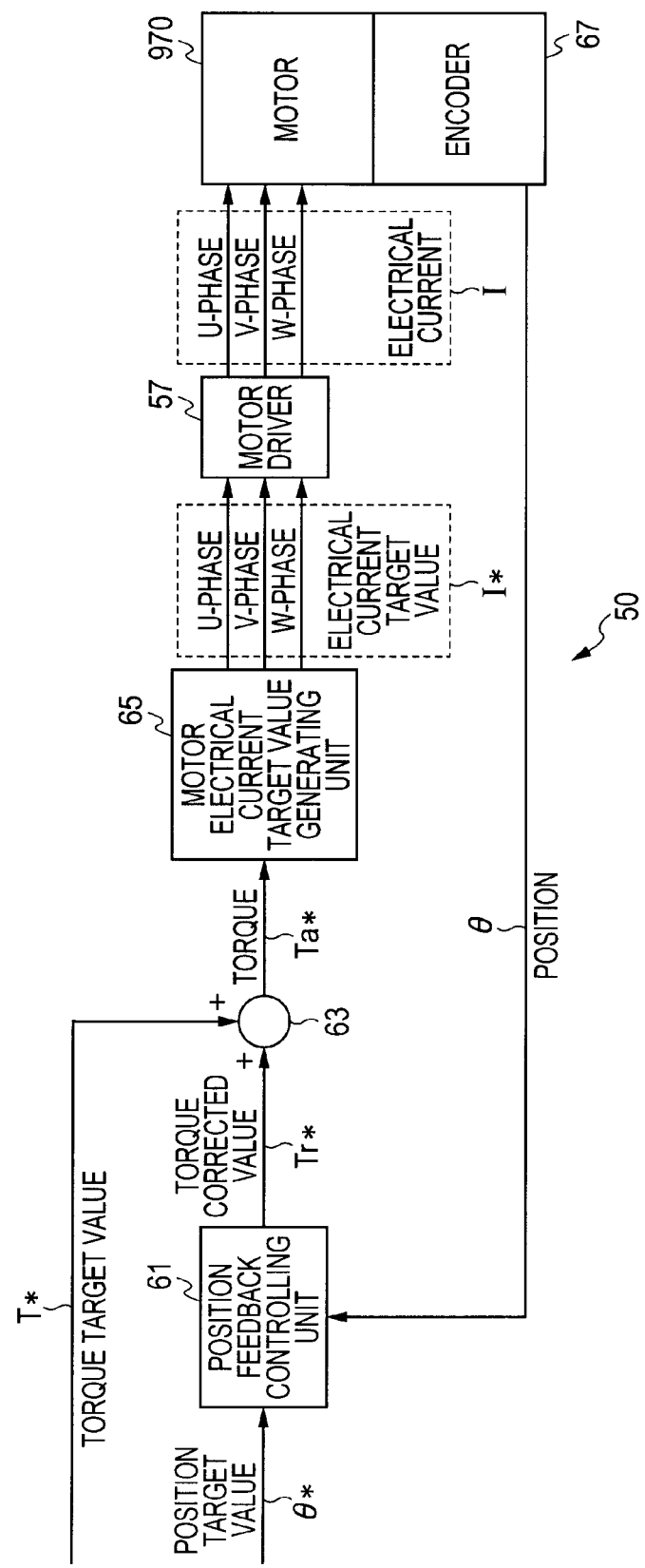
FIG. 12 is a block diagram illustrating a schematic configuration of each drive calculating unit.

Now, referring to FIG. 12, the operation of each of the drive calculating units $55_1$ to $55_6$ of the robot controller 51 will be described. Note that the calculation operation of each of the drive calculating units $55_1$ to $55_6$ is the same, and thus in FIG. 12, the motors $920_1$ to $920_6$ are represented by the motor 920, and the drive calculating units $55_1$ to $55_6$ are represented by the drive calculating unit 55 in the disclosed description.

The drive calculating unit 55 includes a position feedback controlling unit 61, an adder 63, and a motor electrical current target value generating unit 65. A position target value θ* and a position θ of the motor 920 detected by an encoder 67 are input into the position feedback controlling unit 61 and the position feedback controlling unit 61 calculates a torque corrected value Tr*. The adder 63 adds the torque corrected value Tr* to the torque target value T* to generate a torque command value Ta*.

The motor electrical current target value generating unit 65 converts the input torque command value Ta* to an electrical current target value I* of the motor 920. The motor 920 is, for example, a brushless DC motor. The electrical current target value I* is divided into three phases: U-PHASE, V-PHASE, and W-PHASE. The electrical current target value I* is output to the motor driver 57. The motor driver 57 outputs the current I corresponding to the electrical current target value I* to the motor 920 to rotate the motor 920. At this time, the closer the match between the torque target value T* and an actually required torque is, the smaller the deviation between the position target value θ* and the position θ is. In light of this, the torque target value T* is calculated from a value actually measured by the detecting unit 101.

The original detection signal 102 output from the detecting unit 101 is subjected to a filtering process of removing noise by the filtering unit 103. The vibration frequency f of the noise contained in the original detection signal 102 is caused by the natural vibration frequency of the manipulator 1001 and changes according to the posture of the manipulator 1001, the presence or absence of the work W, and the like. For example, in the case in which the detecting unit $101_6$ is a force sensor, when the hand 908 grips the work W, the stiffness of the flexible member 1602 of the detecting unit $101_6$ and the total weight of the hand 908, the work W, and the mounting structure 1604 increase, and the natural vibration frequency of the manipulator 1001 reduces.

Meanwhile, in the case in which the torque is actually measured to calculate the torque target value T*, when a phase delay occurs in the detection signal 107 with respect to the original detection signal 102, the torque target value T* is different from an actually required torque. The higher the speed of the motion is, the more significant the difference is. Accordingly, when a phase delay occurs in the detection signal 107 with respect to the original detection signal 102, the motion speed of the manipulator 1001 needs to be suppressed in order to increase the positioning precision of the manipulator 1001. As a result, the working time of the manipulator 1001 becomes long. For example, the natural vibration frequency is twice or more different between the state in which the manipulator 1001 is folded and the state in which the manipulator 1001 is unfolded.

Meanwhile, assuming that the frequency characteristic of the filtering unit 103 is constant, in order to reduce the noise in the possible frequency band of the natural vibration frequency, the filter cutoff frequency needs to be designed low so as to fit the state in which manipulator 1001 is unfolded. Accordingly, even in a state in which the manipulator 1001 is folded and the natural vibration frequency is twice that in the state in which the manipulator 1001 is unfolded, the detection signal 107 is delayed in phase with respect to the original detection signal 102. Thus, the manipulator can only drive at half the speed than the speed when the filter frequency is set to fit the state in which the manipulator is folded.

In light of this, in the eighth embodiment, the calculating device 104 calculates the vibration frequency f of noise by the same calculation as in the first embodiment. The signal indicating the vibration frequency f calculated by the calculating device 104 is output to the changing unit 106. The changing unit 106 changes the filter coefficient of the filtering unit 103 based on the signal indicating the vibration frequency f. Thus, the filtering unit 103 with the changed filter coefficient can obtain the detection signal 107 well removing noise from the original detection signal 102 and suppressing the phase delay with respect to the original detection signal 102.

The detection signal 107 is input into the robot controller 51 and the robot controller 51 calculates the respective position target values $\theta_1^*$ to $\theta_6^*$ and the respective torque target values $T_1^*$ to $T_6^*$ of the respective motors $920_1$ to $920_6$. Thus, application of the sensor apparatus 100 to the robot apparatus 1000 can increase the positioning precision of the manipulator 1001. Further, the suppression of the phase delay of the detection signal 107 with respect to the original detection signal 102 allows the manipulator 1001 to move at a high speed.

Note that the manipulator 1001 of the eighth embodiment includes the detecting unit $101_6$, which is a force sensor and the detecting units $101_1$ to $101_5$, which are torque sensors, but the manipulator 1001 may include any one of the detecting units. In this case, the positioning precision of the manipulator of the robot apparatus also increases.

Ninth Embodiment

Figure 13:
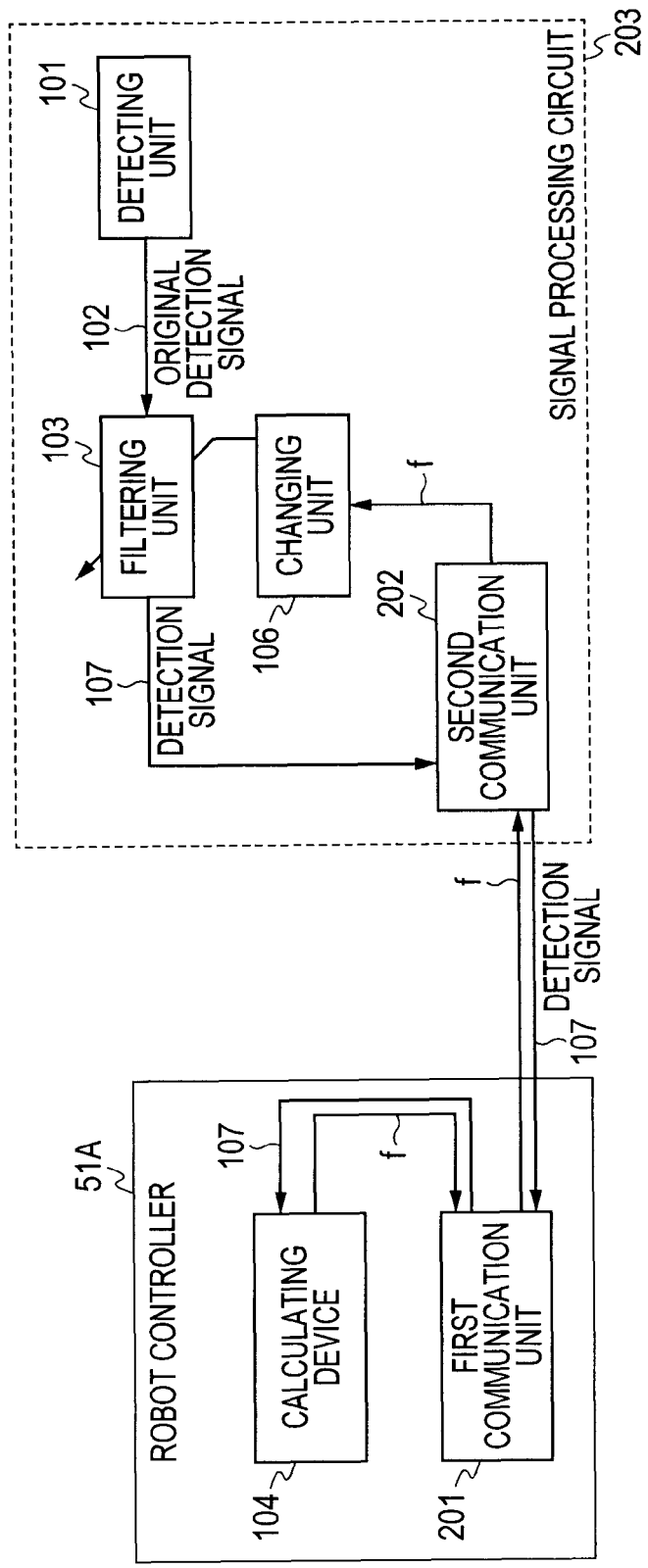
FIG. 13 is a block diagram illustrating a schematic configuration of a sensor apparatus mounted on a robot apparatus according to a ninth embodiment of the present invention.
Figure 14A:
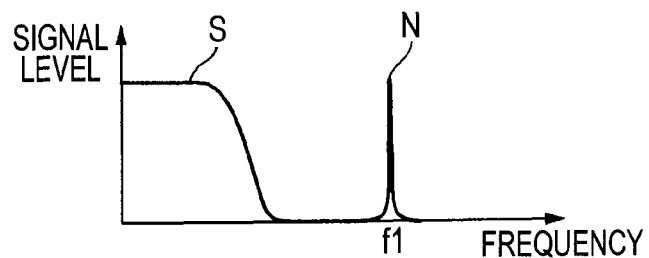
FIG. 14A is a schematic graph of a frequency characteristic of a signal component and a noise component contained in an original detection signal.
Figure 14B:
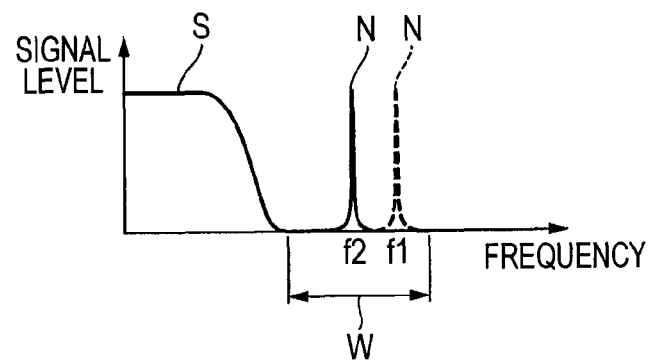
FIG. 14B is a schematic graph of a frequency characteristic of a signal component and a noise component contained in an original detection signal.
Figure 14C:
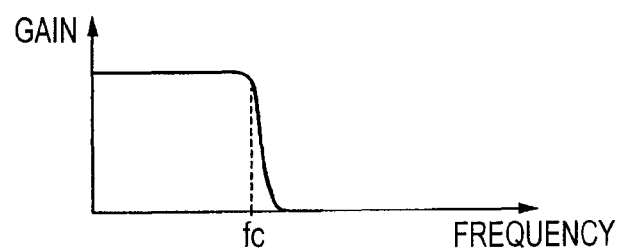
FIG. 14C is a schematic graph of a frequency characteristic of a low pass filter.
Figure 14D:
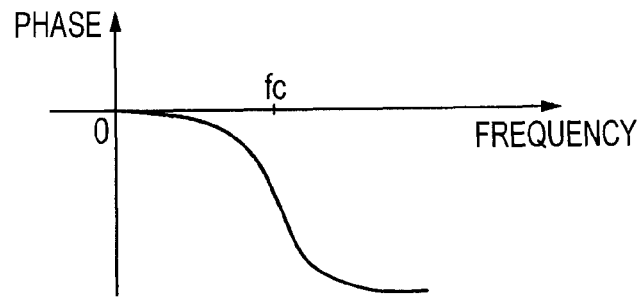
FIG. 14D is a schematic graph of a phase characteristic of the low pass filter.

Now, a robot apparatus according to a ninth embodiment of the present invention will be described. FIG. 13 is a block diagram illustrating a schematic configuration of a sensor apparatus mounted on the robot apparatus according to the ninth embodiment of the present invention. The robot apparatus of the ninth embodiment has the sensor apparatus 100A of the second embodiment.

More specifically, in the ninth embodiment, the robot controller 51A includes the calculating device 104 and the first communication unit 201. Further, the signal processing circuit 203 includes the detecting unit 101, the filtering unit 103, the changing unit 106, and the second communication unit 202, which are mounted on the manipulator 1001. Note that the robot controller 51A is arranged separately from the manipulator 1001.

The signal indicating the vibration frequency f calculated by the calculating device 104 is output to the first communication unit 201 and then sent to the second communication unit 202. The signal indicating the vibration frequency f sent to the second communication unit 202 is output to the changing unit 106. The changing unit 106 changes the filter coefficient of the filtering unit 103 based on the signal of the vibration frequency 105.

This configuration allows the filtering unit 103 to obtain the detection signal 107 well removing noise from the original detection signal 102. Then, the detection signal 107 is output to the second communication unit 202 and then sent to the first communication unit 201. The detection signal 107 sent to the first communication unit 201 is used by the robot controller 51A to calculate the position target values $\theta_1^*$ to $\theta_6^*$ and the torque target values $T_1^*$ to $T_6^*$ of the motors $920_1$ to $920_6$.

Further, communication between the first communication unit 201 and the second communication unit 202 allows the signal processing circuit 203 to separately control the detecting unit 101, the filtering unit 103, and the changing unit 106. The signal processing circuit 203 is mounted on the manipulator separately from the robot controller 51A.

Since the signal processing circuit 203 performs the filtering separately from the robot controller 51A, the signal processing circuit 203 can always filter the original detection signal 102 at a high speed regardless of the calculation load of the robot controller 51A. Further, the signal processing circuit 203 is mounted on the manipulator such that the detecting unit 101 is located close to the filtering unit 103 so as to be immune to electromagnetic noise.

Note that the eighth embodiment has described that the robot apparatus 1000 has the sensor apparatus 100 of the first embodiment and the ninth embodiment has described that the robot apparatus has the sensor apparatus 100A of the second embodiment, but the present invention is not limited to these embodiments. Specifically, the robot apparatus may have any one of the sensor apparatuses in the third to seventh embodiments. In particular, the seventh embodiment of mounting the sensor apparatus on the manipulator having a plurality of natural vibration frequencies is effective in removing noise having a plurality of frequencies.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-205722, filed Sep. 14, 2010, which is hereby incorporated by reference herein in its entirety.

What is claimed is:

1. A sensor apparatus comprising:
   a detecting unit including a flexible member deforming according to a state of an object to be measured and a sensor detecting an amount of deformation of the flexible member and outputting an original detection signal indicating a detection result;
   a digital filter outputting a detection signal obtained by filtering the original detection signal using a filter coefficient;
   a calculation unit calculating a vibration frequency of the flexible member contained in the original detection signal; and
   a change unit changing the filter coefficient of the digital filter to cause the digital filter to function as a filter for attenuating the vibration frequency calculated by the calculation unit.

2. The sensor apparatus according to claim 1, wherein the detecting unit is a force sensor.

3. The sensor apparatus according to claim 2, wherein the calculation unit has a storage unit storing a relational expression or a table indicating a correlation between a force or a torque acting on the object to be measured and the vibration frequency, the detection signal is input into the calculation unit and the calculation unit calculates the vibration frequency using the relational expression or the table.

4. The sensor apparatus according to claim 1, wherein the detecting unit is a torque sensor.

5. The sensor apparatus according to claim 4, wherein the calculation unit has a storage unit storing a relational expression or a table indicating a correlation between a torque acting on the object to be measured and the vibration frequency, the detection signal is input into the calculation unit and the calculation unit calculates the vibration frequency using the relational expression or the table.

6. The sensor apparatus according to claim 1, wherein the original detection signal is input into the calculation unit, the calculation unit performs a fast Fourier transformation to convert the original detection signal from a time domain signal to a frequency domain signal, and extracts a frequency component that is a frequency exceeding a frequency band of a signal component contained in the original detection signal and is a peak value from a calculation result as the vibration frequency.

7. The sensor apparatus according to claim 1, further comprising:
   sending means connected to the calculation unit; and
   receiving means connected to the change unit and receiving a signal indicating the vibration frequency from the sending means.

8. A sensor apparatus comprising:
   a detecting unit including a flexible member deforming according to a state of an object to be measured and a sensor detecting an amount of deformation of the flexible member and outputting an original detection signal indicating a detection result;
   a digital filter having a plurality of filtering units for filtering using a filter coefficient and outputting a detection signal obtained by filtering the original detection signal by the plurality of filtering units;
   a calculation unit calculating each of a plurality of vibration frequencies of the flexible member contained in the original detection signal; and
   a change unit changing the filter coefficient of each of the filtering units to cause the digital filter to function as a filter for attenuating each of the vibration frequencies calculated by the calculation unit.

9. A robot apparatus comprising:
   a robot arm body having a plurality of links coupled through a joint portion, and a hand disposed in a distal link arranged in a distal portion of the plurality of links and gripping an object to be gripped;
   a plurality of actuators driving the plurality of links and the hand;
   a force sensor including a flexible member deforming according to a force or a torque acting on the hand, and a sensor detecting an amount of deformation of the flexible member and outputting an original detection signal indicating a detection result;
   a digital filter outputting a detection signal obtained by filtering the original detection signal using a filter coefficient;
   a calculation unit calculating a vibration frequency of the flexible member contained in the original detection signal;
   a change unit changing the filter coefficient of the digital filter to cause the digital filter to function as a filter for attenuating the vibration frequency calculated by the calculation unit; and a control unit controlling the actuator using the detection signal output from the digital filter.

10. The robot apparatus according to claim 9, wherein the original detection signal is input into the calculation unit, the calculation unit performs a fast Fourier transformation to convert the original detection signal from a time domain signal to a frequency domain signal, and extracts a frequency component that is a frequency exceeding the frequency band of a signal component contained in the original detection signal and is a peak value from the calculation result as the vibration frequency.

11. The robot apparatus according to claim 9, wherein the calculation unit has a storage unit storing a relational expression or a table indicating a correlation between a force or a torque acting on the hand and the vibration frequency, the detection signal is input into the calculation unit and the calculation unit calculates the vibration frequency using the relational expression or the table.

12. The robot apparatus according to claim 9, further comprising:
   sending means connected to the calculation unit; and
   receiving means connected to the change unit and receiving a signal indicating the vibration frequency from the sending means,
   wherein the digital filter, the change unit, and the receiving means are included in the robot arm body; and the calculation unit and the sending means are arranged separately from the robot arm body.

13. A robot apparatus comprising:
   a robot arm body having a plurality of links coupled through a joint portion, and a hand disposed in a distal link arranged in a distal portion of the plurality of links and gripping an object to be gripped;
   a plurality of actuators driving the plurality of links and the hand;
   a torque sensor including a flexible member deforming according to a torque acting on the link, and a sensor detecting an amount of deformation of the flexible member and outputting an original detection signal indicating a detection result;
   a digital filter outputting a detection signal obtained by filtering the original detection signal using a filter coefficient;
   a calculation unit calculating a vibration frequency of the flexible member contained in the original detection signal;
   a change unit changing the filter coefficient of the digital filter to cause the digital filter to function as a filter for attenuating the vibration frequency calculated by the calculation unit; and
   a control unit controlling the actuator using the detection signal output from the digital filter.

14. The robot apparatus according to claim 13, wherein the calculation unit has a storage unit storing a relational expression or a table indicating a correlation between a torque acting on the link and the vibration frequency, the detection signal is input into the calculation unit and the calculation unit calculates the vibration frequency using the relational expression or the table.

* * * * *